United States Patent
An et al.

(10) Patent No.: US 8,104,137 B2
(45) Date of Patent: Jan. 31, 2012

(54) WIPER BLADE

(75) Inventors: Jae Hyuck An, Daegu (KR); Tae Kyung Kim, Daegu (KR); Jong Heon Lee, Daegu (KR); Il Soo Kim, Suwon (KR)

(73) Assignees: Hyundai Motor Company, Seoul (KR); Kia Motors Corporation, Seoul (KR); KCW Corporation, Daegu (KR)

( * ) Notice: Subject to any disclaimer, the term of this patent is extended or adjusted under 35 U.S.C. 154(b) by 341 days.

(21) Appl. No.: 12/479,342

(22) Filed: Jun. 5, 2009

(65) Prior Publication Data

US 2010/0139027 A1   Jun. 10, 2010

(30) Foreign Application Priority Data

Dec. 5, 2008   (KR) .................. 10-2008-0123664

(51) Int. Cl.
*B60S 1/38* (2006.01)

(52) U.S. Cl. .............. 15/250.46; 15/250.44; 15/250.201

(58) Field of Classification Search ............... 15/250.43, 15/250.44, 250.361, 250.201, 250.46
See application file for complete search history.

(56) References Cited

U.S. PATENT DOCUMENTS

| | | | | | |
|---|---|---|---|---|---|
| 2,727,271 | A | * | 12/1955 | Oishei et al. ............... | 15/250.44 |
| 2,728,100 | A | * | 12/1955 | Oishei ......................... | 15/250.44 |
| 5,946,764 | A | * | 9/1999 | Tworzydlo ............... | 15/250.201 |
| 6,785,931 | B2 | * | 9/2004 | Lee et al. .................. | 15/250.46 |
| 2006/0191094 | A1 | * | 8/2006 | Dace-Smith et al. ...... | 15/250.44 |

FOREIGN PATENT DOCUMENTS

| | | | |
|---|---|---|---|
| GB | 2144976 | * | 3/1985 |
| JP | 56-9946 U | | 1/1981 |
| JP | 60-49058 U | | 4/1985 |
| JP | 5-58527 U | | 8/1993 |
| JP | 2006-89043 A | | 4/2006 |
| JP | 2006-096103 A | | 4/2006 |
| JP | 2007-055589 A | | 3/2007 |
| KR | 20-0313018 Y1 | | 5/2003 |

* cited by examiner

*Primary Examiner* — Gary Graham
(74) *Attorney, Agent, or Firm* — Morgan, Lewis & Bockius LLP

(57) ABSTRACT

A wiper blade includes a wiper strip for contacting a windshield glass of a vehicle, a lever assembly supporting the wiper strip to squeeze onto the windshield glass, and a cover member containing the lever assembly, wherein the lever assembly includes, a pair of first levers, each with both ends engaged with and point-supporting the wiper strip to form an engaging portion on the wiper strip respectively, and a pair of the second levers, each with one end hinge-coupled to a corresponding one of the first levers and with the other end coupled with the cover member and the wiper strip.

9 Claims, 3 Drawing Sheets

WIPER BLADE

CROSS-REFERENCE TO RELATED APPLICATION

The present application claims priority to Korean Patent Application Number 10-2008-0123664 filed Dec. 5, 2008, the entire contents of which application is incorporated herein for all purposes by this reference.

BACKGROUND OF THE INVENTION

1. Field of the Invention

The present invention relates to a wiper blade, and more particularly, to a wiper blade which can firmly hold a wiper strip, has improved squeezing onto a windshield glass of a vehicle, and does not lift or chatter when the vehicle is running at high speed.

2. Description of Related Art

A normal wiper blade having a tournament structure includes a lever assembly in which levers are connected with each other. This kind of wiper blade has a bad looking appearance since the lever assembly is exposed on the outside.

In order to solve the foregoing problems with the prior art, a wiper blade having a lever assembly made of synthetic resin is disclosed in Japanese Laid-Open Utility Model Publication Nos. 07-28759 and 07-26266. However, because the lever assembly is made of synthetic resin according to the disclosures of the above documents, there are still other drawbacks of increasing the size of the levers and the lever assembly and enlarging the wiper blade in order to ensure insufficient strength and stiffness.

Japanese Laid-Open Utility Model Publication No. 07-28759 proposes a wiper blade with a pin for preventing the wiper blade from lifting out of a windshield glass of a vehicle when the vehicle is running. However, this construction also increases the size of the wiper blade according to the installed position of the pin, has a bad looking appearance, and cannot securely prevent the wiper blade from lifting.

Korean Patent Application Publication No. 10-2005-78199 discloses a wiper blade. More in detail, the wiper blade includes a wiper strip directly sweeping across the windshield glass, a lever assembly supporting the wiper strip and a cover member containing the lever assembly. The lever assembly includes a plurality of levers connected with each other in a tournament structure, and has a shorter axial length than the axial length of the wiper strip. The cover member supports the wiper strip at the counter ends, and has a plurality of separately formed cover portions.

Since the aforementioned wiper blades have a four-point support structure and are connected by a hinge, the squeezing of both ends of the wiper strip onto the wind shield glass is not good. Because of this problem, the wiper blade may lift or chatter during high speed driving. Furthermore, the above document did not overcome problems of the wiper blade such as a weak structure and an increasing size.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a wiper blade which can firmly hold a wiper strip, has improved squeezing onto a windshield glass of a vehicle, and does not lift or chatter when the vehicle is running at high speed.

In an aspect of the present invention, a wiper blade including a wiper strip for contacting a windshield glass of a vehicle, a lever assembly supporting the wiper strip to squeeze onto the windshield glass, and a cover member containing the lever assembly, wherein the lever assembly includes, a pair of first levers, each with both ends engaged with and point-supporting the wiper strip to form an engaging portion on the wiper strip respectively, and a pair of the second levers, each with one end hinge-coupled to a corresponding one of the first levers and with the other end coupled with the cover member and the wiper strip.

The engaging portion of the first levers formed on the wiper strips may be substantially equally spaced therebetween.

Both ends of each first lever may not be connected to the wiper strip so as to permit both ends thereof to slidably support the wiper strip as an external force is applied to the cover member.

One end of each first lever may not be connected to the wiper strip so as to permit the other end not connected to the wiper strip to slidably support the wiper strip as an external force is applied to the cover member.

Both ends of each first lever may be connected to the wiper strip so as to permit both ends thereof to elastically support the wiper strip as an external force is applied to the cover member.

The wiper blade may further include a third lever connecting the other end of the second lever with the cover member.

A middle portion of the second lever may be hinge-coupled to the cover member, wherein the cover member includes a fixed cover and a pair of flexible covers hinge-coupled to both ends of the fixed cover, respectively, the middle portion of the second lever being fixed to one end of the flexible cover and a third lever may connect the other end of the second lever with the flexible cover.

The first lever may be arc-shaped with a middle portion thereof bulged towards the second lever and spacers each may be formed on one end of the second lever to press the first lever, wherein the second lever is arc-shaped with a middle portion thereof bulged towards the cover member.

The cover member may be arc-shaped with a middle portion thereof bulged towards a wiper arm and a connector may be provided on the middle portion of the cover member, for connecting with the wiper arm.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
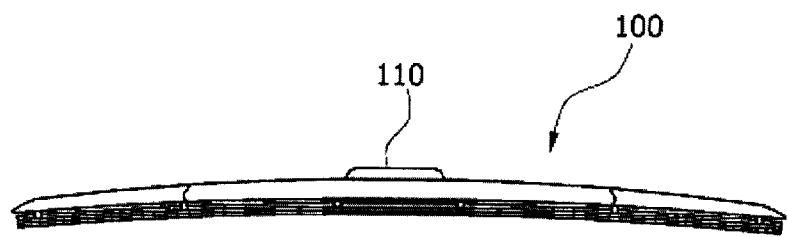
FIG. 1 is a perspective view illustrating an exemplary wiper blade in accordance with the present invention.

FIG. 1 is a perspective view illustrating an exemplary wiper blade in accordance with the present invention. As shown in FIG. 1, the wiper blade 100 of the present invention is connected with a wiper arm via a connector 110 provided on the top portion thereof, and is squeezed onto a windshield glass by a predetermined pressure from the wiper arm. The wiper blade, squeezed onto the windshield glass of a vehicle, is reciprocally rotated within a certain range of angle by the wiper arm to remove impurities such as moisture (e.g., rain, snow and washer fluid) and dust.

Figure 2:
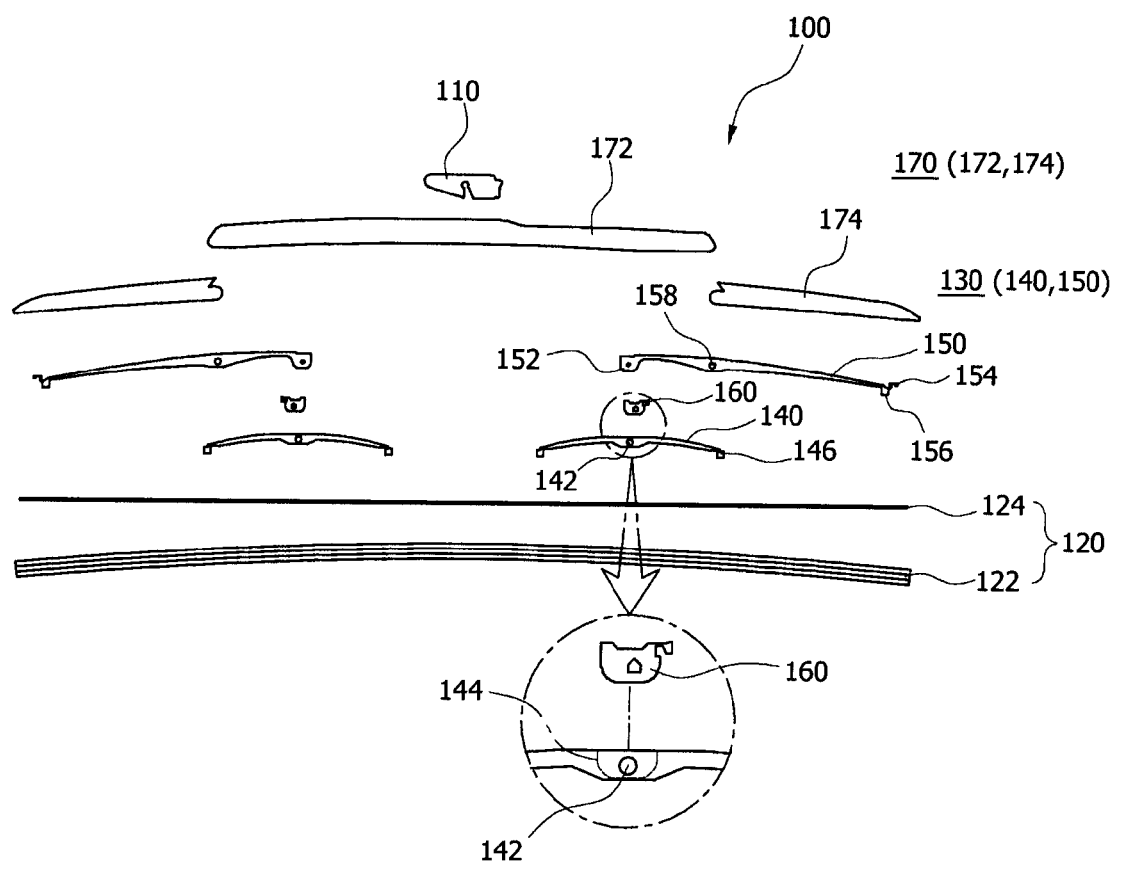
FIG. 2 is an exploded perspective view of the exemplary wiper blade of in FIG. 1.
Figure 3:
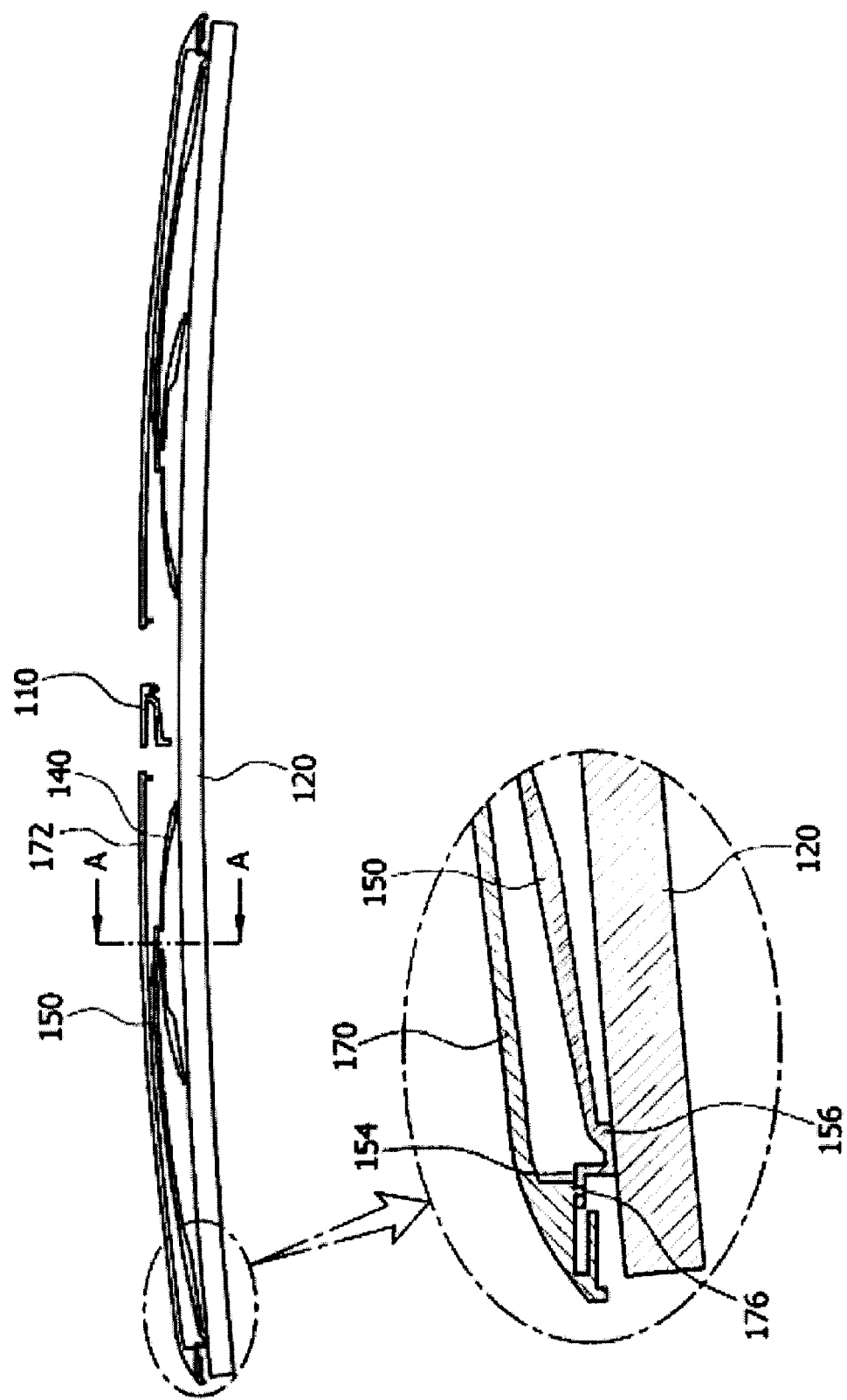
FIG. 3 is a partial cross-sectional view of the exemplary wiper blade of in FIG. 1.
Figure 4:
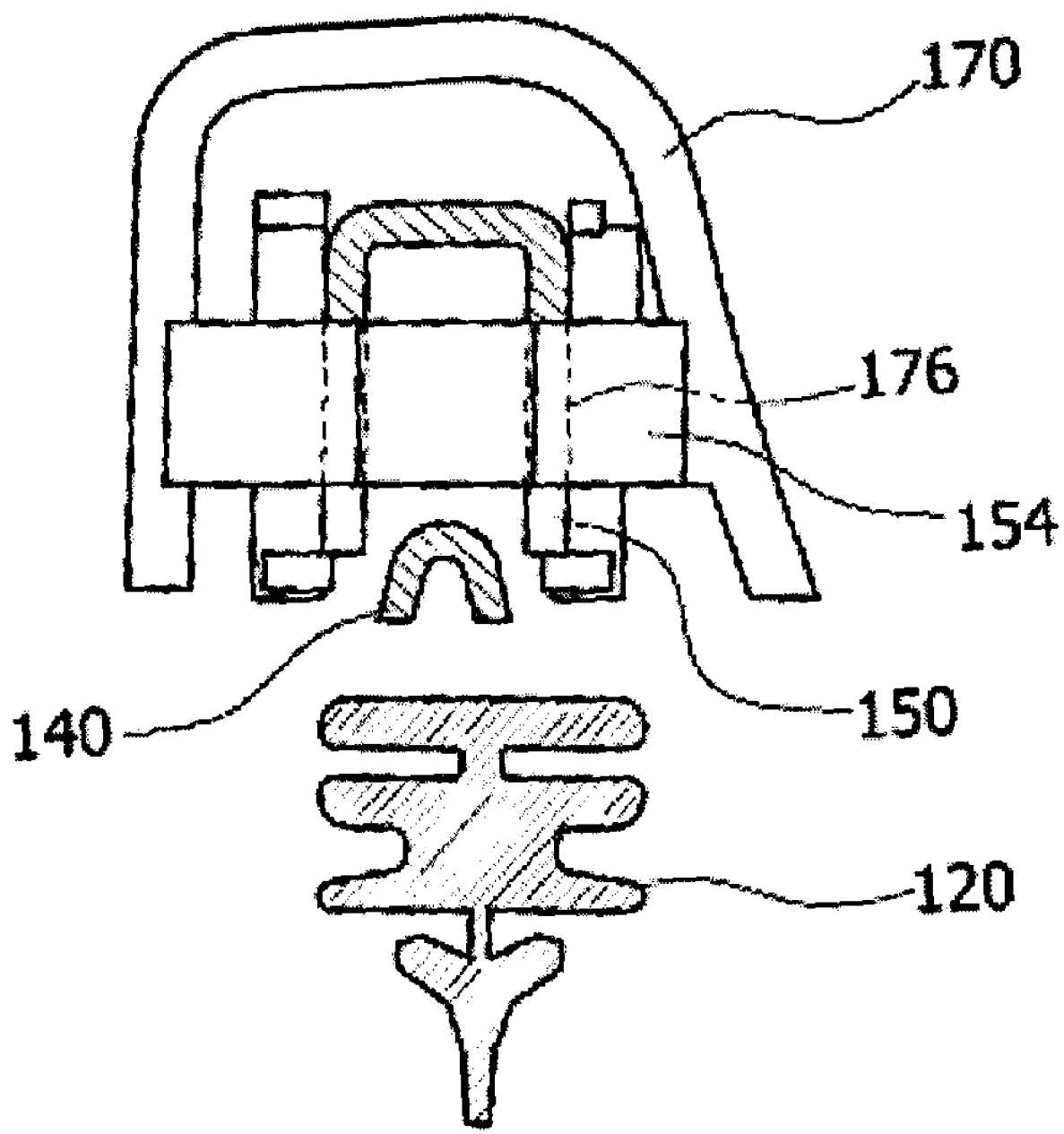
FIG. 4 is a cross-sectional view of the exemplary wiper blade taken along line "A-A" of FIG. 3.

FIG. 2 is an exploded perspective view showing the exemplary wiper blade in accordance with the present invention, FIG. 3 is a partial cross-sectional view showing the exemplary wiper blade in accordance with the present invention, and FIG. 4 is a cross-sectional view of the wiper blade taken along line "A-A" of FIG. 3. Referring to FIGS. 2 to 4, the structure of the wiper blade 100 will be described below.

The wiper blade 100 according to an exemplary embodiment of the present invention includes a wiper strip 120 contacting a windshield glass of a vehicle, a lever assembly 130 supporting the wiper strip 120 to be firmly squeezed onto the windshield glass, and a cover member 170 containing the lever assembly 130.

Among the aforementioned constituent parts, the lever assembly 130 having a six-point support structure can improve the squeezing of the wiper strip 110 onto the windshield glass of a vehicle as well as preventing the wiper blade from lifting and chattering when the vehicle is running at high speed.

The constituent parts of the wiper blade 100 in accordance with an exemplary embodiment of the present invention will be described more in detail hereinafter.

First, the wiper strip 120 is a means for removing impurities including moisture through direct contact with the windshield glass of a vehicle, and includes a blade rubber 122 of a predetermined length and a rail spring 124 applying elasticity and stiffness to the blade rubber 122. This structure of the wiper strip 120 having the blade rubber 122 and the rail spring 124 is well-known in the art, and a detailed description thereof will be omitted herein for the sake of brevity.

The lever assembly 130 includes a pair of the first levers 140, which are formed on both sides of the center of the wiper strip 120 and spaced apart from each other at a predetermined distance, and a pair of the second levers 150 each with one end hinged to a corresponding one of the first levers 140 and with the other end coupled with the cover member 170.

Each of the first lever 140 is arc-shaped, with the central portion bulged towards the second lever 150. A through-hole 142 is formed in the middle portion of the first lever 140, for hinge-coupling to the second lever 150. A space 144 is formed in the top surface of the through-hole 142, and a spacer 160 which will be described later is fitted into the space 144. Yoke-shaped locks 146 for coupling with the wiper strip 120 are formed on both ends of the first lever 140.

Since the first lever 140 configured as above is curved in the shape of an arc, it has a predetermined level of elasticity like a panel spring. Consequently, the first lever 140 supports the wiper strip 120 to be squeezed onto the windshield glass, and the squeezing of the wiper strip 120 can be improved when an external force is applied via the second lever 150 hinge-coupled to the middle portion of the first lever 140.

The second lever 150 is also arc-shaped, with the central portion bulged towards the cover member 170. A through-hole 152 is formed in one end of the second lever 150 has, for hinge-coupling to the middle portion of the first lever 140. A coupling lever 154 for coupling with the cover member 170 and a supporting protrusion 156 for squeezing the wiper strip 120 onto the windshield glass are formed on the other end of the second lever 150. A through-hole 158 is formed in the middle portion of the second lever 150, for hinge-coupling to the cover member 170.

Since the second lever 150 is also curved in the shape of an arc, the second lever 150 squeezes the wiper strip 120 onto the windshield glass of a vehicle either using its own elasticity or applying an external force to the first lever 140.

The spacer 160 is provided on one end of the second lever 150 and is fitted into the space 144, which is formed in the upper surface of the middle portion of the first lever 140. Here, the space 160 is a means for improving the squeezing of the wiper strip 120 onto the windshield glass by pressing the first lever 140 a little more as well as strengthening the hinge-coupling structure of the first and the second levers 140 and 150.

The cover member 170 is a means for improving the squeezing of the wiper strip 120 onto the windshield glass by applying an external force to the lever assembly 130 as well as containing the lever assembly 130. The cover member 170 includes a fixed cover 172 and a pair of flexible covers 174 hinge-coupled to both ends of the fixed cover 172. The middle portion of the second lever 150 is hinge-coupled to both ends of the fixed cover 170, and the coupling lever 154 is fixedly fitted into the coupling groove 176 formed in one end of the fixed cover 170.

Since the fixed cover 172 is also arc-shaped with the central portion bulged towards the wiper arm, it indirectly squeezes the wiper strip 120 onto the windshield glass by applying a force to the second lever 140 using its own elasticity.

According to the present invention, since the wiper blade 100 including of the aforementioned lever assembly 130 has a six-point support structure defined by the first levers 140 and the second levers 150, the wiper blade 100 can supply the equal pressure to the whole wiper strip 120, and the squeezing of the wiper strip 120 onto the windshield glass can be improved. Especially, since the number of supporting points has increased compared to the prior art and the pressure can be delivered to both ends of the wiper strip 120, the lifting and chattering of the wiper blade can be prevented when the vehicle is running at high speed.

In various embodiments of the present invention, one of both ends of the first levers 140 may be decoupled from the wiper strip 120 to slidably support the wiper strip 120 when external force is applied thereon.

In other embodiments of the present invention, both ends of the first levers 140 may be decoupled from the wiper strip 120 to slidably support the wiper strip 120 when external force is applied thereon.

For convenience in explanation and accurate definition in the appended claims, the terms "upper" and "lower" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A wiper blade comprising:
    a wiper strip for contacting a windshield glass of a vehicle;
    a lever assembly supporting the wiper strip to squeeze onto the windshield glass, and a cover member containing the lever assembly, wherein the lever assembly includes:
        a pair of first levers, each with both ends engaged with and point-supporting the wiper strip to form an engaging portion on the wiper strip respectively; and
        a pair of second levers, each with one end hinge-coupled to a corresponding one of the first levers and with the other end coupled with the cover member and the wiper strip;
    wherein a middle portion of each second lever is hinge-coupled to the cover member; and
    wherein the cover member includes a fixed cover and a pair of flexible covers hinge-coupled to both ends of the fixed cover, respectively, the middle portion of each second lever being fixed to one end of a respective flexible cover.

2. The wiper blade in accordance with claim 1, wherein the engaging portion of the first levers formed on the wiper strips are substantially equally spaced therebetween.

3. The wiper blade in accordance with claim 1, wherein both ends of each first lever is connected to the wiper strip so as to permit both ends thereof to elastically support the wiper strip as an external force is applied to the cover member.

4. The wiper blade according to claim 1, wherein each first lever is arc-shaped with a middle portion thereof bulged towards a respective second lever.

5. The wiper blade in accordance with claim 4, further comprising a spacer formed on one end of each second lever to press a respective lever.

6. The wiper blade according to claim 5, wherein each second lever is arc-shaped with a middle portion thereof bulged towards the cover member.

7. The wiper blade according to any of claim 1, wherein the cover member is arc-shaped with a middle portion.

8. The wiper blade in accordance with claim 7, further comprising a connector provided on the middle portion of the cover member.

9. A passenger vehicle comprising the wiper blade of claim 1.

* * * * *